United States Patent
Adair et al.

(10) Patent No.: US 7,732,030 B2
(45) Date of Patent: Jun. 8, 2010

(54) METHOD AND APPARATUS FOR PREFORM CONSISTENCY

(75) Inventors: Emerald J. Adair, Vail, AZ (US); Gray E. Fowler, Allen, TX (US); Judith K. Clark, Leonard, TX (US); Michael M. Liggett, Allen, TX (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 12/260,180

(22) Filed: Oct. 29, 2008

(65) Prior Publication Data

US 2009/0053434 A1 Feb. 26, 2009

Related U.S. Application Data

(62) Division of application No. 11/063,156, filed on Feb. 22, 2005, now Pat. No. 7,601,287.

(51) Int. Cl.
*B29D 22/00* (2006.01)
*B29D 23/00* (2006.01)
*B32B 1/08* (2006.01)

(52) U.S. Cl. ............. 428/36.91; 428/34.5; 428/34.6; 428/36.3; 383/872

(58) Field of Classification Search ............ 383/872; 428/36.9, 36.91, 35.7, 35.2, 292.1, 297.4, 428/34.5, 34.6, 36.3
See application file for complete search history.

(56) References Cited

U.S. PATENT DOCUMENTS 4,615,933 A * 10/1986 Traut .................... 442/180
5,849,234 A   12/1998 Harrison et al. ........... 264/257

FOREIGN PATENT DOCUMENTS

FR   1 330 854   6/1963

* cited by examiner

*Primary Examiner*—Michael C Miggins
(74) *Attorney, Agent, or Firm*—Baker Botts L.L.P.

(57) ABSTRACT

According to one embodiment of the present invention a method of creating a composite with an object having a central axis is provided which comprises wrapping a first fabric layer around the object in one of a clockwise or a counterclockwise direction around the central axis of the object. A second fabric layer is wrapped over the first fabric layer. The second fabric layer is wrapped around the object in the other of the clockwise or the counterclockwise direction around the central axis. The object is placed in a mold and resin is injected into the mold to form the composite.

6 Claims, 1 Drawing Sheet

METHOD AND APPARATUS FOR PREFORM CONSISTENCY

RELATED APPLICATIONS

This application is a divisional of application Ser. No. 11/063,156 filed Feb. 22, 2005, entitled Method and Apparatus for Preform Consistency.

TECHNICAL FIELD OF THE INVENTION

This invention relates in general to the field of composites and, more particularly, to a method and apparatus for preform consistency.

BACKGROUND OF THE INVENTION

One technique utilized in the fabricating composites is resin transfer molding (RTM). RTM generally involves placing fiber or preform reinforcements between mold pieces and then injecting resin or mold between the mold pieces. Both the mold and resin may be heated as needed, depending on the particular application. After the resin or mold has cured, the mold may be opened to retrieve the generated composite, which comprises a combination of the fiber reinforcements and mold.

SUMMARY OF THE INVENTION

According to one embodiment of the present invention a method of creating a composite with an object having a central axis is provided which comprises wrapping a first fabric layer around the object in one of a clockwise or a counterclockwise direction around the central axis of the object. A second fabric layer is wrapped over the first fabric layer. The second fabric layer is wrapped around the object in the other of the clockwise or the counterclockwise direction around the central axis. The object is placed in a mold and resin is injected into the mold to form the composite.

Certain embodiments may provide a number of technical advantages. For example, a technical advantage of one embodiment may include the capability to maintain radome fabric volume within a mold. Other technical advantages of other embodiments may include the capability to increase the thickness of radome shell composites.

Although specific advantages have been enumerated above, various embodiments may include all, some, or none of the enumerated advantages. Additionally, other technical advantages may become readily apparent to one of ordinary skill in the art after review of the following figures, description, and claims.

BRIEF DESCRIPTION OF THE DRAWINGS

To provide a more complete understanding of the present invention and features and advantages thereof, reference is made to the following description, taken in conjunction with the accompanying figures, wherein like reference numerals represent like parts, in which.

DETAILED DESCRIPTION OF EXAMPLE EMBODIMENTS

Figure 1:
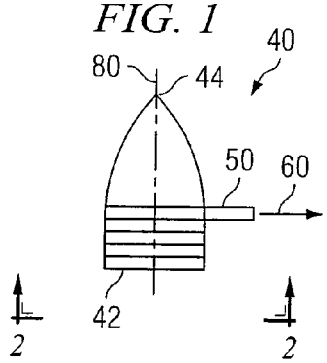
FIGS. 1 and 2 illustrate a clockwise wrapping of radome fabric around a molding object, according to an embodiment of the invention.

It should be understood at the outset that although example implementations of embodiments of the invention are illustrated below, the present invention may be implemented using any number of techniques, whether currently known or in existence. The present invention should in no way be limited to the example implementations, drawings, and techniques illustrated below. Additionally, the drawings are not necessarily drawn to scale.

In resin transfer molding (RTM), typical resins include, but are not limited to, epoxy, vinyl ester, methyl methacrylate, polyester, phenolic, polymers of the preceding, arimid, carbon, synthetic fibers, other suitable resin materials, and combinations of the preceding. The resin or mold may additionally include fillers such as alumnum trihydratesm, calcium carbonate, and other suitable fillers. Typical fiber reinforcements include, but are not limited to, glass, carbon, arimid, other suitable fiber reinforcement materials, or combinations of the preceding.

In environments where electromagnetic communication occur through the composites, the composites may be made of radome material. The terms "radome", "radome material", and variations thereof may generally refer to any material that is at least partially transparent to electromagnetic waves (e.g., radio waves, other communicative waves, or the like). Such radome material in some embodiments may protect a particular object from environmental elements. Thus, in some embodiments, radome materials may facilitate protection of an object while at least partially allowing electromagnetic waves to pass therethrough.

In the creation of some radome composites, general concerns may involve the volume of the fiber occupied by the fiber reinforcements between the mold pieces. For example, it may generally be desirable (1) to ensure that the fiber reinforcements can be placed into the final mold for resin transfer (e.g., between the molding pieces), and (2) to ensure that the fiber reinforcements are placed in a manner that maintains consistent radiofrequency (RF) properties in the produced radome composite. These concerns are elevated when the produced radome composite are being utilized in a precession environment where RF performance must be consistent throughout the various portions of the radome. As an example, some missiles with radome composite shells require RF consistency not only around circumference, but also along the length of the radome composite shell.

Techniques utilized in establishing a fiber volume include a variety of wrapping techniques (e.g., for missile radome composite shells) such as a single direction pressure wind technique, a forced pressure into unwound layers technique, and a non-pressured layers technique. Each of these techniques, however, may result in inconsistent or uneven fiber volumes throughout the radome. For example, the single direction pressure wind technique tends to force the material into bunches creating high-fiber volume locations resulting in poor RF properties for the radome. The forced standard layers and non-pressurized techniques lead to low-fiber volume areas in the tip region of the radome and high-fiber volume areas towards the base of the radome once the female mold portion is added.

With these above concerns in mind, teachings of these invention are directed towards a method that holds the fabric into place ensuring that the fiber volume remains in a desired location through RTM processing. With the fiber volume in the desired location, desired RF consistency may be achieved after RTM.

Figure 2:
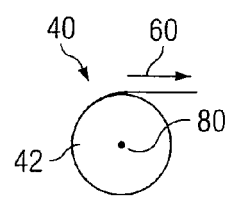
Figure 3:
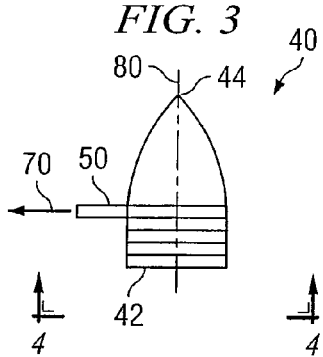
FIGS. 3 and 4 illustrate a counterclockwise wrapping of the radome fabric around the molding object, according to an embodiment of the invention.
Figure 4:
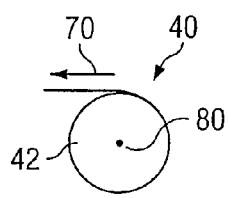
Figure 5:
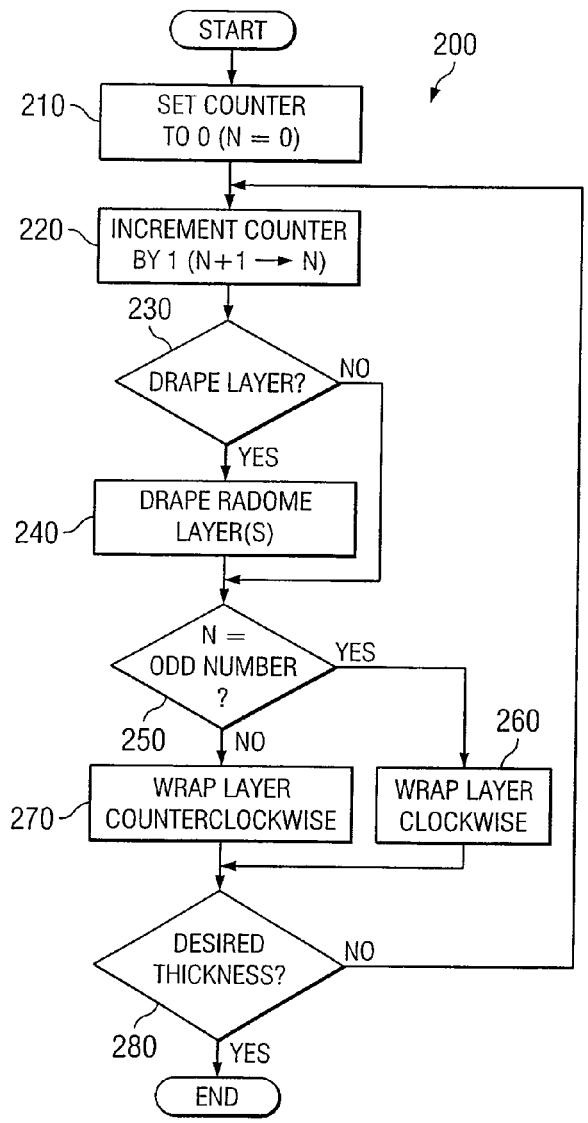
FIG. 5 is a process flow diagram of an embodiment of a process of wrapping a fabric around a molding object.

FIGS. 1 and 2 generally illustrate a clockwise wrapping (e.g., in the direction of arrow 60 around central axis 80) of radome fabric 50 around a molding object 40 and FIGS. 3 and 4 generally illustrate a counterclockwise wrapping (e.g., in the direction of arrow 70 around central axis 80) of the radome fabric 50 around the molding object 40. FIG. 5 is a process flow diagram of an embodiment of a process 200 of wrapping a fabric 50 around a molding object 40. With reference to FIGS. 1-5, the following is an illustration of a process 200 of wrapping the radome fabric 50 around the molding object 40 in a manner that may allow fiber volume to remain in a desire location.

Referring to FIG. 1, object 40 may generally be any object in which radome fabric 50 may be wrapped. In this particular embodiment the object 40 is a male molding piece, utilized in producing a double curved missile shell radome composite. The male molding piece may complimentary to a female molding piece (not explicitly shown). Once the male molding piece is completely wrapped, the male molding piece may be inserted into the female molding piece and processed using RTM techniques.

Radome fabric 50 may be made of any suitable radome material operable to be wrapped around the object 40. In this particular embodiment, the radome fabric 50 is an e-glass fabric. The radome fabric 50 may have varying thicknesses and widths, depending on the particular application. In some embodiments the radome fabric 50 may have a thickness between 1-50 mm and widths between a ¼ inch to ½ inch. In other embodiments, thickness may be less than 1 mm or greater than 50 mm and widths less than ¼ inch or greater than a ½ inch.

The radome fabric 50 may generally be wrapped around the object 40 with tension, compacting any lower layers of radome fabric 50 and drape fabric layers that may have been put into place. For example, as a general description of an embodiment, drape fabric layer(s) (not explicitly show) may be placed on the male mode using conventional layup methods. Then, to ensure that the drape fabric layers do not bulge, radome fabric 50 may be wound with tension, compacting the lower drape fabric layers. Then, more drape fabrics layer(s) may be laid followed by another layer of radome fabric 50. Each wind of radome fabric 50 may be wound in the opposite direction of the last compression wound layer, for example, in the direction of FIGS. 1 and 2 and then the in the direction of FIGS. 3 to 4.

Referring to FIG. 5, the process 200 may generally commence by setting a counter, N, equal to 0 (e.g., N=0) at step 210. The counter may then be incremented by one at step 220. The counter, as described in more detail below, may be utilized to determine which direction to wrap a layer of radome fabric 50.

The process 200 may proceed to step 230 where a determination is made as to whether or not a drape fabric layer of fabric is needed. In some embodiments, such a drape fabric layer may not be needed while in other embodiments such drape fabric layers may be needed. If a drape fabric layer is needed, one or more drape fabric layers (not explicitly shown) may be placed on the object 40 at step 240. If a drape layer is not needed, the process 200 may skip step 240 and proceed to step 250. The drape fabric layer may be substantially similar to the radome fabric 50, yet generally designed to drape over object. As an example of draping, three to five drape fabric layers may be placed on the object 40. Other embodiments may include more or less drape fabric layers.

The process 200 may proceed (either skipping the drape process 240 or engaging in the drape process 240) to step 250 where a determination is made as to the current state of the counter, N (e.g., even or odd). If the counter is at an odd number, the process 200 may proceed to step 260 where the radome fabric 50 is wrapped counterclockwise around the object 40. If the counter is not at an odd number (e.g., the counter is an even number), the process 200 may proceed to step 260 where the radome fabric is wrapped clockwise around the object 40.

For purposes of illustration, the description of process 200 will proceed through step 260 (e.g., the counter, N, is not an odd number), coming back to step 270 on a subsequent loop. FIGS. 1 and 2 are an embodiment of step 260. FIG. 2 is a view taken along line 2-2 of FIG. 1. FIGS. 1 and 2 show a clockwise wrapping of the radome fabric 50 around object 40—e.g., in direction of arrow 60 around a central axis 80 of the object 40. The clockwise wrapping around the object 40 may either be from a base 42 of the object 40 to a tip 44 of the object 40 or from the tip 44 of the object 40 to the base 42 of the object 40. The wrapping around the object 40 is preferably a pressure wrapping or winding that compresses the underlying layers, ensuring that the radome fabric 50 and any underlying layers will maintain in desired position (e.g., a desired volume). Such compression may be accomplished by applying tension on the radome fabric during application of the radome fabric 50 on the object 40.

The process 200 may proceed to step 280 where a determination is made as to whether or not the layers of fabric (e.g., drape fabric layers and radome fabric 50 combined) are the desired thickness. If so, the process 200 may end. If not, the process 200 may loop back to step 220, where the counter, N, is incremented by one.

The process 200 on the subsequent loop may again determine whether or not a drape layer needs to be established at step 230. If so, step 240 will be processed again. If not, step 240 will be skipped.

At step 250, the decision process on this subsequent loop should make the opposite decision made on the preceding loop because the counter was incremented by one at step 220. Accordingly, the number should now be even and the process 200 may proceed to step 270. FIGS. 3 and 4 are an embodiment of step 270. FIG. 4 is a view taken along line 4-4 of FIG. 3. FIGS. 3 and 4 show a counterclockwise wrapping of the radome fabric 50 around object 40—e.g., in direction of arrow 70 around a central axis 80 of the object 40. Similar to that described above, the counterclockwise wrapping around the object 40 may either be from the base 42 of the object 40 to the tip 44 of the object 40 or from the tip 44 of the object 40 to the base 42 of the object 40. Additionally, the wrapping around the object 40 is preferably a pressure wrapping or winding that compresses the underlying layers, ensuring that the radome fabric 50 and any underlying layers will maintain in a desired position (e.g., a desired volume). Such compression may be accomplished by applying tension on the radome fabric 50 during application of the radome fabric 50 on the object 40.

The process 200, once again, proceeds to step 280 where a determination is made as to whether or not the desired thickness has been achieved. If so, the process 200 ends. As an example of thickness, an embodiment may utilize thirty three (33) total layers with the pressure wrapped radome fabric 50 being lay in a changing clockwise and counterclockwise fashion for every three to five layers of drape layer placed on the object.

From the end of the process 200, the object 40 (male mold piece) having the radome fabric 50 and drape layers, if any, may be coupled to the female molding piece (e.g., placed inside the female molding piece) and the RTM process may commence. The lay-up of the layers in the above described process 200 holds the fiber volume in place while the RTM process is utilized. With the fiber volume in place, consistent RF qualities may be achieved throughout the radome composite—for example, around the circumference and along the length of the radome (from tip to base).

A variety of different RTM processes may be utilized, including, but not limited to vacuum assisted resin transfer molding (VARTM). The mold material may additionally be made a variety of organic and inorganic polymers operable to serve as radome material. In some embodiments, processes other than RTM may be utilized.

Utilizing the above process, thicker missile radome composites may be created than those using conventional techniques (e.g., techniques produced with ceramic materials). As an example, utilizing this technique a radome composite made of organic polymers may produce a missile shell almost ⅜ of an inch thick.

Although the above process has been generally been described wrapping in one direction and then wrapping in another direction, in other embodiments of the invention, the wrapping may occur by wrapping twice clockwise and twice counterclockwise. Additionally, the process may begin by wrapping in either the clockwise or counterclockwise direction (e.g., start the increment, N, in process 200 of FIG. 5 at 1). Further, while the object 40 is generally shown in FIGS. 1-4 as a domed/conical shaped object 40 in this embodiment, in other embodiments the object 40 may take on a variety of other shapes, including but not limited to columnar, cubed, and the like.

Numerous other changes, substitutions, variations, alterations, and modifications may be ascertained to one skilled in the art and it is intended that the present invention encompass all such changes, substitutions, variations, alterations, and modifications as falling within the scope of the appended claims.

What is claimed is:

1. A radome shell having a central axis, comprising:
   a first radome fabric layer wrapped in one of a clockwise or a counterclockwise direction around the central axis within the radome shell; and a
   a second radome fabric layer wrapped over the first radome fabric layer in the other of the clockwise or the counterclockwise direction around the central axis within the radome shell.

2. The radome shell of claim 1, further comprising:
   an organic polymer dispersed around the first radome fabric layer and second radome fabric layer.

3. The radome shell of claim 1, wherein both of the first radome fabric layer and the second radome fabric layers are e-glass.

4. The radome shell of claim 1, wherein
   the radome shell is a missile radome shell, and
   the missile radome shell has a thickness of at least a ¼ inch.

5. The radome shell of claim 1, further comprising:
   a plurality of alternating layers of the first radome fabric layer and the second radome fabric layer, wherein
     each of the plurality of first radome fabric layers are wrapped in a clockwise direction around the central axis within the radome shell, and
     each of the plurality of second radome fabric layers are wrapped in a counterclockwise direction around the central axis within the radome shell.

6. The radome shell of claim 5, further comprising:
   at least one drape fabric layer between each of the plurality of alternating layers of the first radome fabric layer and the second radome fabric layer.

\* \* \* \* \*